July 24, 1956 A. O. CHRISTENSEN 2,756,336

AUTOMATIC FREQUENCY CONTROL CIRCUIT

Filed Jan. 8, 1954 2 Sheets-Sheet 1

INVENTOR
ALTON O. CHRISTENSEN
BY George Sipkin
B. L. Zangwill
ATTORNEYS

July 24, 1956 A. O. CHRISTENSEN 2,756,336

AUTOMATIC FREQUENCY CONTROL CIRCUIT

Filed Jan. 8, 1954 2 Sheets-Sheet 2

INVENTOR
ALTON O. CHRISTENSEN

BY George Sipkin
B. L. Zangwill
ATTORNEYS

United States Patent Office 2,756,336

Patented July 24, 1956

2,756,336

AUTOMATIC FREQUENCY CONTROL CIRCUIT

Alton O. Christensen, Rolfe, Iowa, assignor, by mesne assignments, to the United States of America as represented by the Secretary of the Navy Application January 8, 1954, Serial No. 403,084

2 Claims. (Cl. 250—36)

Figure 1:
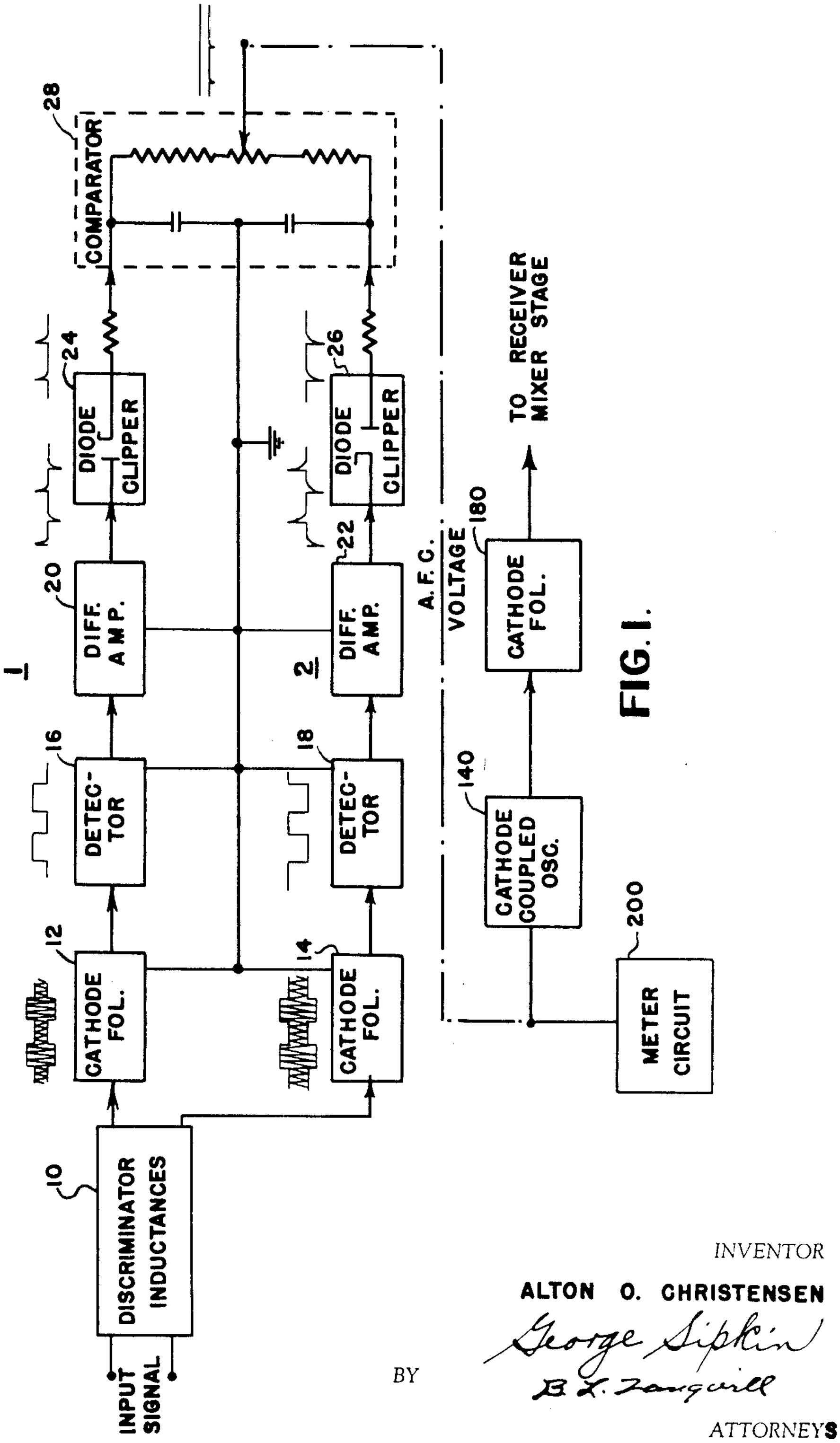

The present invention relates to an automatic frequency control circuit and more particularly to an automatic frequency control circuit wherein a voltage taken from a frequency responsive circuit is converted into a direct current modulating voltage for controlling the frequency of an oscillator. The output frequency of the oscillator is used to maintain the intermediate frequency of a super-heterodyne type of receiver at a desired center frequency.

The invention has particular application to a receiver for frequency shift keyed signals, although it may be used with any receiver utilizing the heterodyne principle to produce an intermediate frequency. In the reception of automatic frequency shift keyed signals employing baud coded signals comprising marks and spaces, intelligence is conveyed by transmission of a signal of one frequency representing a mark and a second signal of a different frequency representing a space. Such a transmission system may be regarded as transmission of a carrier wave which periodically shifts from one predetermined frequency to a second predetermined frequency. In a frequency shift keyed signal system, an efficient and generally specialized automatic frequency control circuit is required, due to the irregular variations in the pulse duration of the mark and space signals and the shift in frequencies, whereas in conventional frequency modulated reception systems, the automatic frequency control circuits are adapted to operate on a single frequency band. Consequently, conventional circuits would be incapable of operating with such frequency shift coded signals in the manner desired.

Generally, automatic frequency controlled circuits for use on frequency modulated transmission systems have been restricted in operation to a limited number of predetermined center frequencies and further, in the amount of frequency shift. Usually, the systems are restricted to a single center frequency. In such arrangements, accurate tuning has been difficult to obtain because of considerable frequency drift at the high frequencies such systems operate and the limitations of frequency correction of such systems.

However, the conventional automatic frequency control circuit is not usable with frequency-shift keyed signals because deviations in frequency toward one side may occur much more frequently than deviations toward the other side so as to produce an apparent variation in center frequency. Furthermore, a signal of the true center frequency is never transmitted on the system. In the present system, two signals are simultaneously produced from each baud coded signal received, which signals are differentiated and clipped to produce two output voltages of opposite polarity and equal duration. The amplitudes of the two output voltages will therefore vary only with deviation from the center frequency, and the difference between these amplitudes is an accurate measure of deviation of the center frequency from its desired value.

In accordance with the teachings of the present invention, an automatic frequency control circuit is provided which will operate efficiently to correct or hold the center frequency of a receiver for frequency shift keyed signals as well as conventional signal receivers utilizing the heterodyne principle. In such receivers, all frequency shift signals developed, regardless of the magnitude or pulse duration, within the band width limits of the receiver will operate the system of the present invention. Further, the same frequency control is automatically achieved on any center frequency over the entire band width to which the receiver may be tuned and wherein the system will maintain the correct tuning of the receiver with an error of less than one per cent of the amount of frequency shift.

Accordingly, an object of the present invention is the provision of an automatic frequency control circuit that will insure highly accurate tuning of a signal receiver.

Another object of the invention is the provision of an automatic frequency control circuit for automatically correcting deviations from the center frequency of a received signal over the entire band width of a receiver.

A further object of the invention is the provision of an automatic frequency control circuit for returning or holding a signal receiver to a center frequency regardless of the magnitude of the frequency shift or pulse duration of a received signal.

Still another object of the present invention is the provision of an automatic frequency control circuit which is simple in design yet accurate and dependable in operation.

Figure 2:
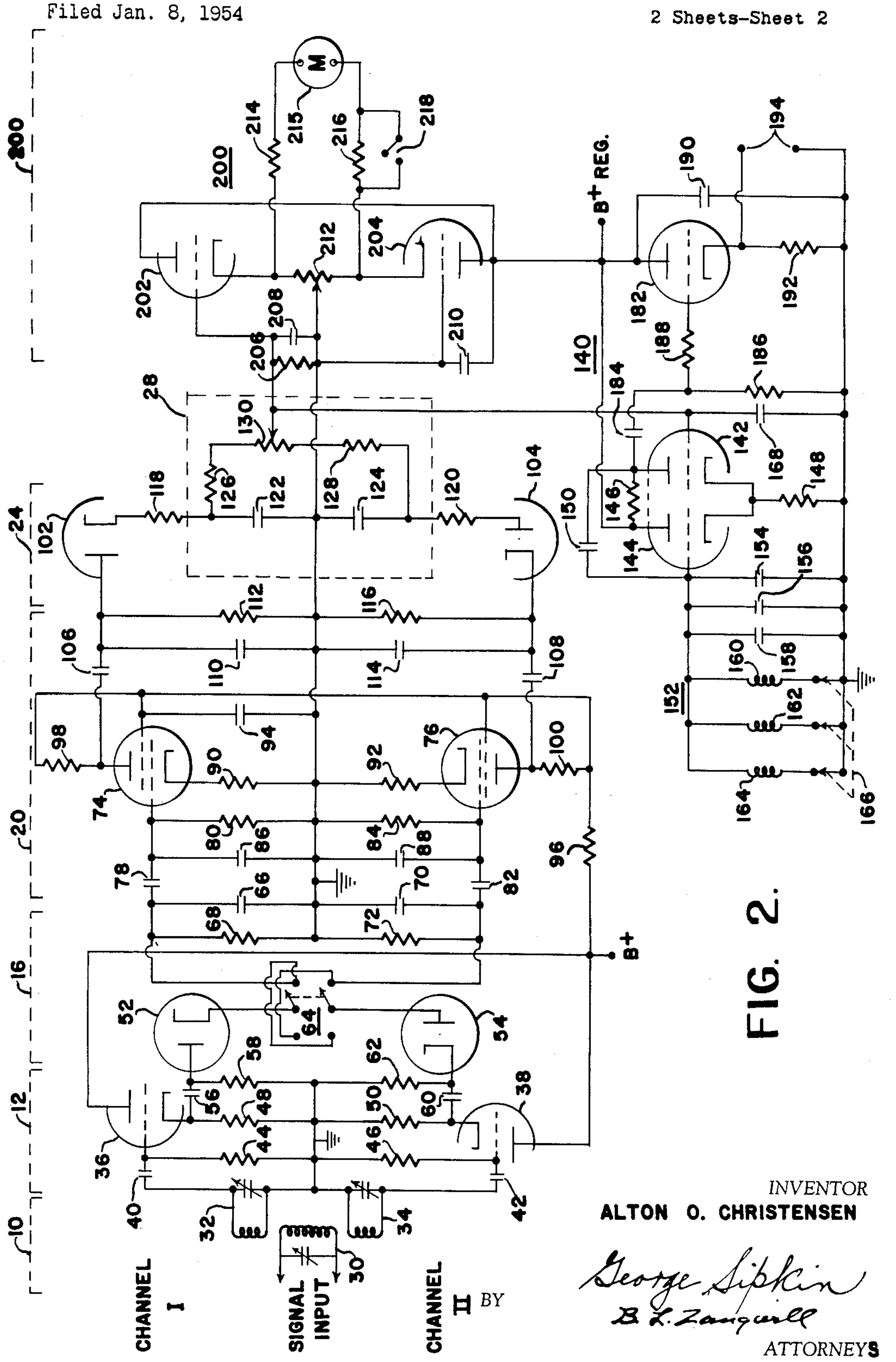

Other objects and features of the invention will become apparent to those skilled in the art as the disclosure is made in the following detailed description of the invention as illustrated in the accompanying sheets of drawings and in which:

Fig. 1 is a block diagram showing of a preferred embodiment of the present invention; and Fig. 2 is a schematic diagram showing the automatic frequency control circuit embodying the present invention in a particular form.

Referring now to the drawing, wherein like reference characters designate like or corresponding parts throughout the several views, there is shown in Fig. 1 a block digram of a system comprising the automatic frequency control circuit of the present invention and wherein a signal derived from a frequency responsive circuit 10 is fed to a pair of cathode follower stages 12 and 14 comprising the first stages of balanced mark and space channel circuits 1 and 2. These latter balanced circuits are similar to each other in that the components and the arrangements thereof comprising the respective circuits are similar to each other. The output signal of the cathode follower stages 12 and 14, which signals may be in the form of pulse signals, are then applied to a pair of diode detector stages 16 and 18 wherein the signal pulses are separated from their carrier wave. The signals are then shaped and amplified in the differential amplifiers 20 and 22 and clipped in the diode clipper or limiter stages 24 and 26 wherein an output signal having a single polarity is obtained. The two output signals of the clipper stages 24 and 26 are then compared in a comparator circuit 28 whereby a resultant direct current automatic frequency control or modulating voltage indicative of the deviation of the receiver from the center frequency is developed. This modulating voltage derived from the comparator circuit 28 is utilized to appropriately vary the generated frequency of a cathode coupled oscillator 140 which signal frequency is then fed through a cathode follower stage 180 and applied to the mixer stage of the receiver as a correcting or holding voltage for the receiver. A portion of the signal voltage is also taken from the output of the comparator 28 and fed to a meter circuit 200 wherein a direct visual indication is given of any deviation of the receiver from the center frequency.

As an illustration of possible wave forms to which this circuit is well adapted and the operations that each stage performs upon the signal, there is shown above each stage of the automatic frequency control circuit of Fig. 1 the wave forms of a typical square wave pulse signal such as encountered in frequency shift keyed signals. It is obvious, of course, that many varied and complex wave forms may be introduced in the circuit in which case the succeeding wave forms in each stage will be considerably different than those shown but the general function of each stage will remain constant with respect to the operations upon the input signal.

For a more detailed description of the arrangement and operation of the automatic frequency control circuit, reference is now made to the schematic diagram of Fig. 2 wherein an input voltage taken from a convenient portion of the receiver such as an intermediate frequency stage is applied to a discriminator inductance circuit 10 having a tuned primary circuit 30 and a pair of tuned secondary frequency selective circuits 32 and 34, one of which is tuned above and the other below the central intermediate frequency. This discriminator inductance circuit 10 may well be the discriminator inductance circuit ordinarily employed in the conventional circuits of the receiver. The voltages developed across the secondary tuned circuits are fed to a pair of cathode follower tubes 36 and 38, each having a control grid element, by way of a pair of coupling capacitors 40 and 42 in the respective control grid circuits of tubes 36 and 38. Each of the control grids are connected to a common ground through a pair of resistors 44 and 46 across which is developed a potential difference proportional to the frequency variation of the input signal to the discriminator inductances. Thus, the operation of the discriminator inductances is conventional in producing amplitude variations in the output signals proportional to the frequency variation of the input signals.

Each of the cathode follower tubes 36 and 38 besides having a control grid element, have a plate element and a cathode element. The plate element of each of the tubes is connected directly to a source of B+ potential, while the cathodes of each of the tubes are connected to ground through biasing resistors 48 and 50 respectively. The cathode follower stages 12 and 14 function to isolate the discriminator inductances from the following stages by presenting a high input impedance to the inductances and a low output impedance to the following stages and further provide a suitable power gain. These stages are connected to a pair of diode detectors tubes 52 and 54 of diode detector stages 16 and 18 through a coupling circuit comprising capacitors 56 and 60 and resistances 58 and 62 interposed between the cathode element of the cathode follower tubes and the respective elements of the diode detector tubes. The diode detector stages 16 and 18 have their output connected in opposition in that the amplitude modulated signal output from cathode follower tube 36 is fed to the plate element of diode detector tube 52 whereas the amplitude modulated signal output from cathode follower tube 38 is fed to the cathode element of diode detector tube 54.

A double pole, double throw switch 64 is connected in the output circuits of diode detector tubes 52 and 54 including the cathode and plate elements respectively such that the input wave to each of the two channels may be phase inverted if desired. Thus, by throwing the switch from one position to another, the output connections of the diode detector stages are reversed to thereby effectively place one or the other diode detector stage in a specific channel. A smoothing circuit comprising capacitors 66 and 70 and resistors 68 and 72 is connected to the respective output circuits of the diode detector tubes. Consequently, the pulse signal output of the diode detector stages developed across the resistances 68 and 72 comprising a potential difference or voltage which varies in accordance with the respective envelopes of the original input wave, as impressed on the tuned secondaries 32 and 34, is smoothed out by removing the ripples therein.

Smoothing circuits 66, 68 and 70, 72 are coupled to the respective control grid elements of amplifier tubes 74 and 76 in channels 1 and 2. A differentiating circuit consisting of capacitors 78 and 82 and resistances 80 and 84 is interposed in each of the channels between the amplifier tubes 74 and 76 and the smoothing circuits of the diode detectors. The function of the differentiating circuits of the two channels is to eliminate the baud length of the signal as a parameter whenever the automatic frequency control circuit is employed in multiplex or teletype frequency shift keyed signals systems, since each baud coded signal thus produces a single sharp pulse at the beginning and end thereof. Capacitors 86 and 88 connected to the respective control grids of amplifier tubes 74 and 76 and to ground operate in conjunction with resistors 82 and 84 as an integrating circuit to further shape the pulse signal output from the diode detector stages in a suitable fashion in order to obtain a more definite and accurate performance of the frequency control circuit. Amplifier tubes 74 and 76 each further include a cathode element, a screen grid element, and a plate element. Resistors 90 and 92 are connected from the cathodes of the respective amplifier tubes 74 and 76 to ground to provide cathode biasing for the amplifying tubes. The screen grid elements have a common by-pass capacitor 94 connected directly to the B+ power supply through a decoupling resistor 96 while the plate elements of the amplifier tubes are connected to the B+ potential through de-coupling resistor 96 and plate load resistors 98 and 100. The plate elements of amplifier tubes 74 and 76 which are connected to a pair of diode tubes 102 and 104 of the diode clipper or limiter stages 24 and 26 have interposed in their output circuit a coupling capacitor 110 and resistor 112 and capacitor 114 and resistor 116. The integrating networks act to further integrate the signal pulse as derived from the amplifier to produce a signal pulse of sufficient duration to charge the long time constant memory of a balanced comparator circuit 28.

Diode clippers tubes 102 and 104 of the respective channels 1 and 2, each of which have a cathode element and a plate element, are interposed in the channels with their output connected in opposition with each other such that the signals to diode clipper stage 24 are fed to the plate element of tube 102 while the signals to diode clipper stage 26 are fed to the cathode element of tube 104. The diode clipper tubes 102 and 104 are loaded by means of resistors 118 and 120 respectively and conduct current for one-half of the signal input cycle to thereby function to eliminate the pulses produced by the trailing edge of the signal pulse by clipping or limiting the signal input to excursions of one polarity. Comparator circuit 28 thus derives a signal output from the diode clippers having a positive and a negative polarity and includes a long-constant memory circuit comprising a pair of relatively large capacitors 122 and 124 connected in series to ground with resistors 118 and 120 respectively and paralleled by an arrangement of three series-connected resistances including resistors 126 and 128 and potentiometer 130 which arrangement is interposed between the resistors 118 and 120 and capacitors 122 and 124. Capacitors 122 and 124 and resistances 126 and 128 respectively are preferably of the same value, although the resistance of potentiometer 130 may be of any suitable value.

Initially, the comparator circuit is balanced by varying the potentiometer 130 such that whenever signal voltage outputs from the diode clipper stages 24 and 26 are impressed across the comparator circuit, and the signal voltages impressed on tuned secondaries 32 and 34 have the same magnitude, the total direct current output voltage developed between the arm of the potentiometer 130 and ground is zero. After this initial adjustment, when a frequency shift is encountered by the receiver, a D. C. voltage will be developed across the potentiometer proportional to the frequency shift of the signal receiver, and having a polarity corresponding to the sense of such deviation. The variable tap of potentiometer 130 connects to both a direct reading meter circuit 200 whereby deviations from a mean or center frequency may be directly indicated and observed and to a cathode coupled oscillator 140 whereby the direct current voltage output of the potentiometer, referred to as the automatic frequency control voltage, functions to modulate the oscillator and cause a change in the oscillatory frequency proportional to the amplitude of the modulating voltage.

The direct current control voltage available from the comparator output is fed to the control grid element of an oscillator tube 142. Oscillator tube 142 coacts with an oscillator tube 144, which may be in the same envelope for convenience, to produce a signal output of a frequency depending upon the values of the components of the oscillator circuit. The application of a modulating automatic frequency control voltage to the control grid element of the oscillator tube 142 will cause a change in the oscillatory frequency proportional to the modulating voltage. Thus, a linear variation of oscillatory frequency will be obtained with the variation in amplitude of the modulating voltage.

Tubes 142 and 144 each include a plate element, a control grid element and a cathode element. The plate element of tube 144 is connected directly to a source of regulated B+ potential while plate element of tube 142 is connected to the regulated B+ potential through a load resistor 146. The cathode elements of the two tubes are each connected through a single resistor 148 to ground, which resistor acts to provide degenerative feed-back to the oscillatory circuit. Connected to the control grid element of tube 144 is a feedback condenser 150 interposed between the anode element of tube 142 and the control grid element of tube 144. A tank or frequency maintaining unit 152 comprising a series of parallel capacitors 154, 156, 158 and selectable inductors 160, 162 and 164, each of which is connected to a common ground, is connected in the grid circuit of tube 144. The inductors are selectively connected in or out of the tank circuit by means of a band switch arrangement 166 whereby any one of the inductors 160, 162 and 164 may be selectively placed in the parallel tank circuit with capacitors 154, 156 and 158 to permit selection of the frequency range of the unit at will. Connected to the control grid element tube 142 and to ground is a capacitor 168 which functions to reflect a capacitive reactance into tube 144 in order to maintain an oscillation in the tank circuit of the oscillator. Depending upon the values of the impedance of cathode resistor 148, the impedance of the plate resistor 146 and the impedance of the capacitor 150, the amount of change of oscillatory frequency, due to the application of a modulating voltage, is proportional to the LC ratio of the tank circuit.

The operation of the cathode coupled oscillator in producing a change in oscillatory frequency proportional to the modulating automatic frequency control voltage is as follows: Assume that the control grid of each oscillator tube is at the same potential and both tubes are conducting, tube 144 having a greater conductance than tube 142 since resistor 146 functions to drop the anode voltage of tube 142. Assume that the control grid element of tube 144 becomes more positive by means of a stray thermal effect or other phenomena, then more current will flow in tube 144, causing a larger voltage drop across cathode resistor 148. Since one side of this resistor is at ground potential, an increased voltage drop will mean that the cathode of tube 144 becomes more positive since it is directly connected to the resistor 148. Raising the potential of this cathode will further reduce the current being conducted through tube 142, reducing the voltage drop across resistor 146, thus raising the potential of the feedback capacitor 150 adjacent the point of connection to the anode element of tube 142. Capacitor 150 cannot change potential instantaneously so the increase in potential is immediately communicated to the grid element of tube 144, causing a still greater current to be conducted through this tube. This change in potential at the control grid element of tube 144 sets the capacitors 154, 156 and 158 and inductances 160, 162 and 164 or the ones in the circuit at that particular moment into oscillation at a frequency determined by the total capacitance and inductance in the circuit.

As the circuit oscillates, tube 144 with capacitor 168 will act as a variable reacter in controlling the amount of capacitance reflected back into the tank circuit of the oscillator. The modulating automatic frequency control voltage applied to control grid element of tube 142, changes in potential of this grid and causes a change in the conduction of tube 142 with a resulting change in voltage across feedback condenser 150. Hence, variation of the potential on the control grid element of tube 142 causes a variation in the output frequency of the oscillator. In effect, since frequency is inversely proportional to change in capacitance, the capacitance reflected to the tank circuit will vary the total capacitance of the tank circuit to thereby effectively change or vary the frequency of the circuit.

The output of the cathode coupled oscillator circuit 140 is fed to a cathode follower stage 180 including cathode follower tube 182 by way of a coupling circuit including capacitor 184, resistor 186 and a grid current limiting resistor 188. Tube 182 includes a plate element, a control grid element and a cathode element. The plate element is connected to a source of regulated B+ potential and by-passed to ground by means of a capacitor 190 and the cathode element is connected to common ground through a cathode resistor 192. The output of the cathode follower stage, which is used as a coupling stage to the next or the mixer stage of the receiver is taken across the cathode resistor 192 and fed to a set of terminals 194 whereupon the signal may be readily connected, by suitable means, to the mixer stage of the receiver.

At many times it has been found useful to provide visual indication of the operation of the automatic frequency control circuit and also the deviations of the frequency from the mean or center frequency. A meter circuit 200 connected to the output of the comparator circuit is provided to accomplish such a function. Meter circuit 200 includes a pair of triode tubes 202 and 204 each having an anode element, a control element and a cathode element. The output from potentiometer 130 of the comparator circuit is fed to the control grid element of tube 202, which has a grid biasing resistor 206 and capacitor 208 connected thereto and to ground. The control grid element of tube 204 is connected directly to the common ground while the anode element of tubes 202 and 204 are connected directly to a source of regulated B+ potential. A suitable R. F. by-pass capacitor 210 is connected to the anode elements of the tubes to the common ground.

A potentiometer 212 having its stationary terminals connected to the cathode elements of the triode tubes 202 and 204, respectively, functions to provide equal potentials across the cathode elements of the two tubes by means of a variable tap connected directly to the common ground. Thus, when the output of the comparator circuit is zero volts the variable tap of the potentiometer 212 is varied such that the conduction of tubes 202 and 204 is equal. However, when a D. C. automatic frequency control voltage is present across the potentiometer 130 of the comparator circuit, the control grid element of tube 202 will be varied in accordance with the control voltage and consequently, the conduction of tube 202 will be varied in accordance with the variation of the voltage potential on its grid element. It will be noted however that after the initial adjustment of the potentiometer 212 and the cathode circuit of these tubes, the conduction of meter tube 204, with its grounded control grid, will remain constant at all times.

A current metering instrument 215 of any suitable type but preferably a double-swing meter reading in microamperes is placed across the common cathode potentiometer 212 with resistances 214 and 216 on either side and in series therewith. It will be seen that after initial adjustment of potentiometer 160, whereby the conduction of the meter tubes 202 and 204 will be equalized at zero input voltage, the meter 215 will read an indication of zero since the current flow therethrough will be zero. Whenever a voltage is present at the comparator circuit and the potential of the control grid of meter tube 202 is varied with the accompanying variation in conduction, the current through the meter 215 will be varied in a direction which will indicate the differences in conduction of tubes 202 and 204.

Therefore, when a positive voltage potential is applied to the control grid of tube 202, the current flow through the cathode circuit of this tube will be increased and the indication of the meter will be a positive one. However, should a negative potential be applied to the control grid of tube 202, conduction of this tube will be lessened whereby a greater current will be conducted through tube 204 than 202. Therefore, the current through the meter 215 will be reversed and a negative reading will be obtained on the meter 215. In instances when a more sensitive indication is desired, a suitable switching arrangement 218 is placed across resistor 216 in order to short this resistance. The effective removal of this resistor increases the sensitivity of the circuit by lowering the effective resistance in the meter circuit. Accordingly it is clear that a visual indication of any frequency shift of the receiver, its amplitude and direction as provided by the automatic control frequency voltage, will be indicated on the directly indicating meter 215.

*Operation*

During operation of the receiver, the automatic frequency control circuit operates to correct any frequency shift occurring in a signal receiver or to hold the mean frequency at the desired center frequency by tapping a portion of the discriminator inductance voltage from the regular receiver circuit. This voltage is then applied through a cathode follower amplifier stage which functions to provide coupling and power gain to the automatic frequency control circuit. The signal voltage, which may be of the pulse type, is detected in a diode detector whereupon the envelope of the carrier signal wave is obtained, differentiated and integrated for producing a signal pulse whose amplitude is proportional to the amount of frequency shift without the baud length of the signal as a parameter and then amplified and further integrated to produce a pulse of sufficient duration to charge a long time constant memory circuit of the comparator circuit. Diode clippers or limiters are employed to eliminate the undesired negative or positive excursions of the signal pulses in the respective channels whereby a signal output having a single polarity is derived and then fed to a comparator circuit, which comparator circuit develops a voltage output whenever the signal voltage applied from each of the diode clipper stages do not have the same magnitude. This voltage developed, which is referred to as a modulating automatic frequency control voltage, acts to vary the oscillatory frequency of a cathode coupled oscillator in proportion with the amplitude of the signal voltage. The variations in oscillatory frequency are fed to a cathode follower circuit and a mixer stage of the signal receiver whereby the frequency shift is corrected or the frequency held to a mean frequency.

It will be noted that this frequency shift will be proportional to the amplitude of the automatic frequency voltage which amplitude is determined by the amount of frequency shift. Therefore, the circuit will operate to correct any frequency shift regardless of the amount. Also, due to the elimination of the baud length as a parameter, very accurate comparisons may be made in the comparator circuit whereby great accuracy is obtained by the automatic frequency control circuit. In order to obtain a direct reading of the frequency shift of the receiver a direct reading meter circuit is employed which is operable to give an indication of the frequency shift in either direction from a mean or center frequency. Since the automatic frequency control circuit does not operate on any one particular frequency but will operate on any voltage received from the discriminator inductances, it is operable over the entire band width of the receiver.

It is therefore apparent that the invention disclosed provides novel means to accurately hold or correct a receiver operating on the heterodyne principle. Furthermore the frequency shift signals developed from any shift, regardless of its magnitude or pulse duration, within the band width limits of any particular design will operate the automatic frequency control system. It will also be obvious that this same automatic frequency control can be achieved on any center frequency over the entire band width to which the receiver may be tuned and to do so with an error of less than one per cent of the amount of frequency shift.

It should be understood, of course, that the foregoing disclosure relates to only a preferred embodiment of the invention in that numerous modifications or alterations may be made therein without departing from the spirit and the scope of the invention as set forth in the appended claims.

What is claimed and desired to be protected by Letters Patent of the United States is:

1. In an automatic frequency control circuit for controlling the frequency deviations of a frequency shift signal receiver wherein a frequency discriminator inductance derives an alternating signal which varies in amplitude in proportion to the frequency deviations from a center frequency comprising a pair of channel circuits, each channel circuit having in series a detector for separating the carrier wave from said alternating signal, a differentiating amplifier circuit including means for shaping the signal and for eliminating the duration of the signal as a parameter to provide a signal whose amplitude is proportional to the amount of frequency deviations, and a clipper means for limiting excursions of the signal to one polarity, a balanced comparator circuit including a long-constant memory circuit connected to the outputs of each channel means for developing a direct current signal voltage having an amplitude proportional to the frequency deviations from the center frequency, an oscillator circuit connected to said balanced comparator circuit and operative to produce an output signal varying in frequency in accordance with the variations in the amplitude of the direct current signal input whereby variations in the oscillator frequency are usable to maintain a mean frequency in the signal receiver.

2. An automatic frequency control circuit for controlling the frequency deviations of a frequency shift signal receiver wherein a frequency discriminator inductance derives an alternating signal which varies in amplitude in proportion to the frequency deviations from a center frequency comprising a pair of channel circuits, each channel circuit having in series a detector for separating the carrier wave from said alternating signal, a differentiating amplifier circuit including means for shaping the signal and for eliminating the duration of the signal as a parameter to provide a signal whose amplitude is proportional to the amount of the frequency deviation, and a clipper means for limiting excursions of the signal to one polarity, a balanced comparator circuit including a long-constant memory circuit connected to the outputs of each channel means for developing a direct current signal voltage output having an amplitude proportional to the frequency deviations from the center frequency, an oscillator circuit connected to said balanced comparator circuit and operative by said signal voltage output to produce an output signal varying in frequency in accordance with the amplitude of the signal voltage and a metering circuit connected to said comparator circuit for visually indicating the amplitude and direction of the frequency deviations.

References Cited in the file of this patent

UNITED STATES PATENTS

| | | |
|---|---|---|
| 2,475,074 | Bradley et al. | July 5, 1949 |
| 2,552,140 | Boothroyd et al. | May 8, 1951 |
| 2,645,717 | Massman | July 14, 1953 |